Dec. 18, 1928.
P. O. GUNKEL
STORAGE BATTERY CASE
Filed Aug. 10, 1925
1,696,001
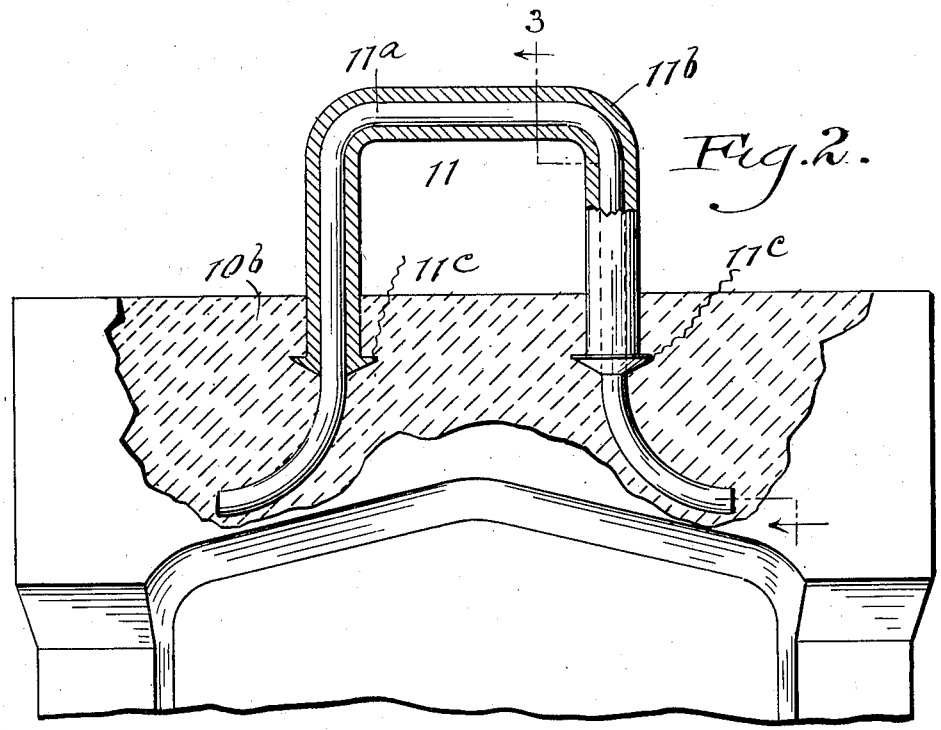
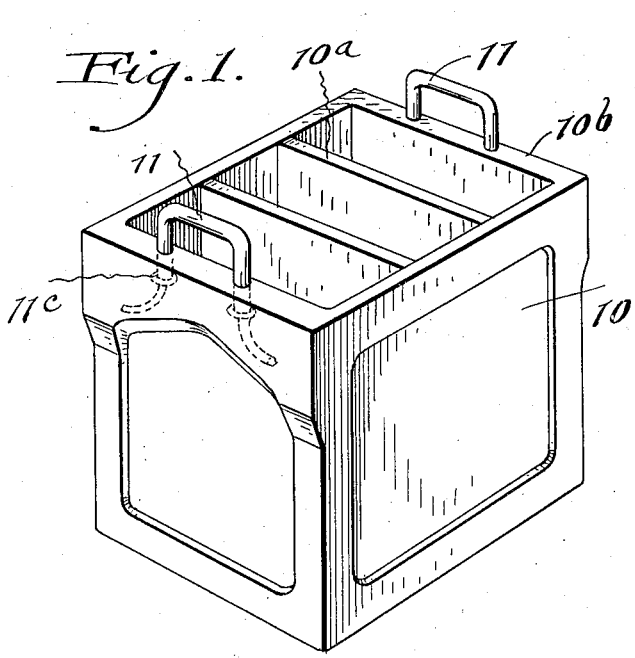
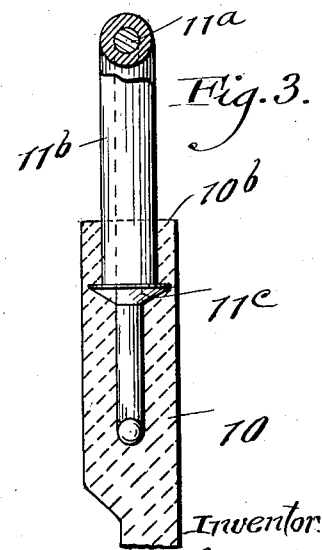
Inventor
Paul O. Gunkel
Rivis Hudson & Kent
attys.

Patented Dec. 18, 1928.

1,696,001

UNITED STATES PATENT OFFICE.

PAUL O. GUNKEL, OF WELLAND, ONTARIO, CANADA, ASSIGNOR TO JOSEPH STOKES RUBBER COMPANY, OF TRENTON, NEW JERSEY, A CORPORATION OF NEW JERSEY.

STORAGE-BATTERY CASE.

Application filed August 10, 1925. Serial No. 49,220.

This invention relates to storage battery cases generally formed of hard rubber by molding the case in a suitable press out of a batch of hard rubber composition and vulcanizing it.

Cases of this kind are provided with handles on the ends, either rubber handles molded integrally with the case, or metal handles attached to the end walls.

The integrally molded handles are objectionable because they are rather easily broken, particularly by the hold-down straps, and the metal handles are not satisfactory because they are attacked by the acid, or eaten away by electrolysis, whether they are fastened onto the ends of the case by screws or whether they are inserted in the composition of the case before vulcanization.

The principal object of the invention is to provide a battery case which is more durable and serviceable than prior cases of this kind, and particularly one which is provided with metal handles which will not be weakened or destroyed by acid and electrolysis and which effectively reinforce the ends of the case.

The handles made in accordance with the present invention are preferably embedded in the end walls of the case in the molding operation, and the portions which protrude above the end walls as well as portions which project down into the end walls are, prior to the embedding or molding operation, covered with rubber or other acid resistant material, the hard rubber composition being forced by the press around the covered portions of the handles, and in the subsequent vulcanizing operation the handle coverings and hard rubber composition are thoroughly knitted together, forming a perfect seal where the handles protrude from the ends of the case.

The invention may be further briefly summarized as consisting in certain novel details of construction, and combinations and arrangements of parts which will be described in the specification and set forth in the appended claims.

In the accompanying sheet of drawings wherein the preferred embodiment of the invention is illustrated, Fig. 1 is a perspective view of a three-compartment case, with handles formed and secured to or in the case in accordance with my invention; Fig. 2 is an enlarged view of a portion of the end of the case with portions in section; and Fig. 3 is a transverse sectional view substantially along the irregular line 3—3 of Fig. 2.

Referring now to the drawings, 10 represents the case as a whole, which as before stated, is preferably formed of hard rubber molded in a press from hard rubber composition and then cured by the usual vulcanizing process. The case is generally provided with transverse partitions $10^a$, forming compartments, of which there may be any number, and it is thus formed into a unitary or monobloc construction since the case in its entirety is molded in one operation from a batch of hard rubber composition.

The handles 11, which extend up from the end walls $10^b$ of the case, are embedded in the end walls, the embedded portions serving to reinforce the end walls which are thickened, as illustrated, to provide sufficient stock to accommodate the embedded portions.

In this instance the metal portions $11^a$ of the handles are formed of iron or steel wire in substantially U-shape, with their ends flared laterally, but I do not regard the particular shape illustrated, or the fact that the handles are formed of wire, as essential to the invention.

An important feature of the invention is the fact that the U-shaped portions of the handles projecting above the end walls $10^b$ of the case, and portions which project into and are embedded in the end walls are provided with a cover $11^b$ of acid resistant material, preferably hard rubber, though possibly other materials such as celluloid or phenol condensation product might be employed.

In this instance the lower embedded ends of the covering $11^b$ are flanged laterally, as indicated at $11^c$, this being desirable as it assists in anchoring the handles into the case.

In carrying out the invention I proceed as follows: The metal portions $11^a$ of the handles are shaped up and then are evenly or uniformly covered (with the exception of the flared uncovered ends) with the acid resistant material, which as previously stated is preferably rubber. Hard rubber composition is employed and before the handles are embedded in the end walls of the case the rubber covering is either wholly or partially cured.

Next the handles are placed in and supported by the end walls of the mold, with the portions to be embedded extending freely downward from the handle-supporting parts of the mold. A batch of uncured or plastic hard rubber composition is then placed in the mold, and the plunger of the press is lowered, causing the composition to be squeezed up so as to completely fill the mold cavity and to embed the lower portions of the handles to substantially the extent illustrated in the drawings. Then the case is cured, either in the press or in a separate vulcanizer, and in the vulcanizing operation the composition of the case and the handle coverings are thoroughly knitted together, forming perfect seals where the handles protrude from the case.

By forming and applying the handles in the manner described above, neither the acid from the battery, nor electrolysis can effect the metal, and the handle is as durable as the body of the case. I regard it as of considerable importance that the acid resistant handle coverings not only enclose the portions of the handles protruding above the ends of the case, but that the coverings extend down into the case composition, for otherwise the metal would be attacked by electrolysis and acid at the seam of the case top.

I do not desire to be confined to the precise details or arrangements shown, but aim in my claims to cover all modifications which do not involve a departure from the spirit and scope of my invention.

Having thus described my invention, I claim:

1. A storage battery case having handles with portions wholly embedded in the end walls, the handles being formed of metal with a covering of acid resistant material similar to the case composition, the handle coverings extending down into the case composition united directly therewith.

2. A storage battery case having metal handles with portions wholly embedded in the end walls, the protruding parts of the handles, and at least portions of the embedded parts being covered with acid resistant material, the embedded parts being united directly with the case composition.

3. The method of forming a storage battery case with metal handles on the end walls, which comprises covering the metal handles with acid resistant material and then molding the case from plastic composition so as to entirely embed portions of the handles covered by the acid resistant material, and then hardening the case with the handles embedded therein so that the embedded portions of said resistant material will be united with the plastic composition of the case.

4. The process of making a storage battery case having metal handles on the end walls, which comprises covering at least portions of the handles with a hard rubber composition and at least partly curing the rubber thereon, then molding the case from a batch of hard rubber composition so that rubber covered portions of the handles are embedded in and surrounded by the case composition, and then vulcanizing the case thereby uniting the covering therewith.

5. A composition storage battery case having handles covered with an acid resisting material, the lower portions of said handles being embedded within and united directly with the composition comprising the end walls, and having the extreme lower ends displaced with respect to other portions to prevent disengagement from the case.

6. A storage battery case having handles covered with an acid resisting material, said covering terminating in annular flanges, the lower portions of said handles being embedded within and entirely surrounded by the composition comprising the end walls and to a depth to include the flanges.

7. A storage battery case having handles covered with an acid resisting material, said covering having annular flanges, the lower portions of said handles being embedded within and entirely surrounded by the composition comprising the end walls and to a depth to include the flanges, and the extreme lower ends of the handle being flared to prevent disengagement from the case.

In testimony whereof, I hereunto affix my signature.

PAUL O. GUNKEL.